US010377652B1

(12) United States Patent
Hanson et al.

(10) Patent No.: US 10,377,652 B1
(45) Date of Patent: Aug. 13, 2019

(54) PROCESS FOR ENHANCED FRACTIONATION OF RECOVERED WASTE STREAMS

(71) Applicant: Fremont Industries, Inc., Shakopee, MN (US)

(72) Inventors: Kyle Hunter Hanson, Shakopee, MN (US); Michael Todd Oldsberg, Chaska, MN (US)

(73) Assignee: Fremont Industries, Inc., Shakopee, MN (US)

( * ) Notice: Subject to any disclaimer, the term of this patent is extended or adjusted under 35 U.S.C. 154(b) by 921 days.

(21) Appl. No.: 14/959,508

(22) Filed: Dec. 4, 2015

Related U.S. Application Data

(60) Provisional application No. 62/088,252, filed on Dec. 5, 2014.

(51) Int. Cl.

| | |
|---|---|
| ***C02F 1/24*** | (2006.01) |
| ***C02F 9/00*** | (2006.01) |
| ***C02F 9/02*** | (2006.01) |
| ***C02F 1/54*** | (2006.01) |
| *C02F 1/00* | (2006.01) |
| *C02F 1/52* | (2006.01) |
| *C02F 1/28* | (2006.01) |
| *C02F 101/32* | (2006.01) |

(Continued)

(52) U.S. Cl.
CPC .................. *C02F 9/00* (2013.01); *C02F 1/24* (2013.01); *C02F 1/547* (2013.01); *C02F 1/004* (2013.01); *C02F 1/28* (2013.01); *C02F 1/52* (2013.01); *C02F 1/66* (2013.01); *C02F 2101/32* (2013.01); *C02F 2101/325* (2013.01); *C02F 2103/22* (2013.01); *C02F 2303/18* (2013.01); *C02F 2305/04* (2013.01)

(58) Field of Classification Search
None
See application file for complete search history.

(56) References Cited

U.S. PATENT DOCUMENTS 2,759,607 A * 8/1956 Boyd .................... B03D 1/008 209/170
4,417,985 A * 11/1983 Keane ...................... B03B 1/04 210/221.1

(Continued)

FOREIGN PATENT DOCUMENTS

| | | |
|---|---|---|
| AU | 2003271388 A1 * | 7/2005 |
| CA | 1116765 * | 1/1982 |
| GB | 1098716 * | 10/1968 |

OTHER PUBLICATIONS

Alther, George. "Put the Breaks on", Chemical Engineering, p. 82-88. Mar. 1998.

(Continued)

*Primary Examiner* — Thomas M Lithgow
(74) *Attorney, Agent, or Firm* — Haugen Law Firm PLLP

(57) ABSTRACT

A method is provided for recovering fractions from an animal rendering process wastewater stream, wherein the fractions include one or more of fat, oil, grease, and protein derived from an animal source. To recover the fractions, the wastewater stream is processed to separate insoluble or immiscible contaminants as collected skimmings, and treating the collected skimmings with an effective amount of a nonionic demulsifying surfactant.

13 Claims, 2 Drawing Sheets

(51) Int. Cl.
*C02F 103/22* (2006.01)
*C02F 1/66* (2006.01)

(56) References Cited

U.S. PATENT DOCUMENTS

| | | | | |
|---|---|---|---|---|
| 4,454,047 | A * | 6/1984 | Becker | B03D 1/016 210/705 |
| 4,702,798 | A | 10/1987 | Bonanno | |
| 5,283,322 | A | 2/1994 | Martin et al. | |
| 5,558,781 | A | 9/1996 | Buchold et al. | |
| 6,013,157 | A | 1/2000 | Li et al. | |
| 6,548,102 | B2 | 4/2003 | Fenske et al. | |
| 7,497,955 | B2 | 3/2009 | Scheimann et al. | |
| 7,566,469 | B2 | 7/2009 | Scheimann | |
| 8,841,469 | B2 | 9/2014 | Shepperd et al. | |
| 8,962,059 | B1 | 2/2015 | Froderman | |
| 2008/0110577 | A1 | 5/2008 | Winsness | |
| 2014/0155639 | A1 | 6/2014 | Sticklen et al. | |

OTHER PUBLICATIONS

Babayan, Vigen K. "Specialty Lipids and Their Biofunctionality", Lipids, vol. 22, No. 6, p. 417-420. 1987.

Norrie, et al. "Investigating the Molecular Heterogeneity of Polysorbate Emulsifiers by MALDI-TOF MS", J. Agric. Food Chem., 2001, 49, 3335-3340.

Mukesh et al., "Lipase Catalysed Esterification of Isosorbide and Sorbitol", Biotechnology Letters, vol. 15 No. 12 (Dec. 1993), 1243-1246.

Compendium of Chemical Technology, IUPAC Recommendations, 2nd. Ed., 1987, 1997, pp. 16 and 166. Compiled by Alan D. McNaught and Andrew Wilkinson.

IUPAC-IUB Commission of Biochemical Nomenclature, "The Nomenclature of Lipids", Biochem J., 1978, 171, 21-35.

ICI Americas, Inc. "The HLB System: a time-saving guide to emulsifier selection", (c) 1976, revised 1980.

McCutcheon's Division, MC Publishing Co., McCutcheon's vol. 1: Emulsifiers and Detergents, 1997, North American Ed., pp. iii and 211.

* cited by examiner

PROCESS FOR ENHANCED FRACTIONATION OF RECOVERED WASTE STREAMS

CROSS-REFERENCE TO RELATED APPLICATIONS

This application claims priority to U.S. Provisional Patent Application Ser. No. 62/088,252, filed on Dec. 5, 2014 and entitled "Process for Enhanced Fractionation of Recovered Waste Streams," the content of which being incorporated herein in its entirety.

FIELD OF THE INVENTION

The present invention relates to wastewater treatment processes generally, and more particularly to the promotion of separation of fats, oils, greases, and proteins from wastewater streams collected from an animal rendering facility.

BACKGROUND OF THE INVENTION

Wastewater from animal tissue processing operations presents several challenges to operators. Wastewater from the animal rendering facility is collected from several different sources, including floor washing, equipment cleaning and sanitation, carcass rinsing, and several other related flows derived from the processing of live animals. The resultant wastewater mixture includes solids in the form of animal tissues, as well as animal tissue components, including fats, oils, greases, and proteins which are too small to be easily screened. Nevertheless, such components contribute to total chemical oxygen demand (COD) and biological oxygen demand (BOD), which represent threshold limitations for the facility's wastewater output to municipal or other water treatment systems. Reduction of such constituents from the wastewater stream can therefore address wastewater effluent quality thresholds and may even serve to reduce municipal wastewater permitting fees where COD and BOD of the wastewater effluent may be reduced.

Additionally, certain of the animal matter components in the wastewater stream may have value in the form of additives for livestock feed and other possible uses. Recovery of such components from the wastewater stream may accordingly present a revenue stream for the facility operator, while simultaneously reducing wastewater effluent volumes. Such materials may be considered "byproducts" of the animal rendering process, with their own commercial value.

Oftentimes, the animal rendering byproducts mix with the wastewater stream into emulsions, which pose a problem for facilities attempting to recycle water and stay in compliance with permissible discharge limits. Separation of fats, oils, greases, and proteins from emulsions by mechanical separation means, such as decanters, centrifuges, and the like has proven to be largely ineffective. Consequently, there exists a need to chemically promote the "breaking" of emulsions formed in animal rendering process wastewater streams, so that the valuable fat, oil, grease, and protein byproducts may be effectively and efficiently recovered.

SUMMARY OF THE INVENTION

By means of the present invention, valuable byproducts from an animal rendering process wastewater stream may be recovered, while further reducing the volume of effluent wastewater to a municipal treatment facility. The method includes collecting an animal rendering process wastewater stream from an animal rendering facility, and processing the wastewater stream to separate insoluble or immiscible contaminants as collected skimmings. The collected skimmings are then treated with an effective amount of a demulsifying surfactant to promote the separation of the byproducts from the collected skimmings. The collected byproducts, or fractions, may include one or more of fat, oil, grease, and protein from an animal source. In some embodiments, the demulsifying surfactant includes one or more alkoxylated fatty acid esters of sorbitan.

In another embodiment, a method for recovering fractions from an animal rendering process wastewater stream includes collecting the wastewater stream from an animal rendering facility, and screening the wastewater stream with a screening device having a sieve size to separate solids having a particle size larger than the sieve size from the wastewater stream. The method further includes conditioning the wastewater stream with a chemical conditioning agent, including at least one of a flocculating agent, a coagulating agent, an adsorbent agent, and a pH-adjusting agent. Subsequent to conditioning the wastewater stream, the method includes applying a floatation process to the wastewater stream in a first retention tank to buoy contaminants toward a gravitationally upper surface of the wastewater stream to form a float region of contaminants. Such float region of contaminants are mechanically removed from the wastewater stream as collected skimmings, which are then treated at 20-90° C. with an effective amount of a non-ionic demulsifying surfactant to promote the separation of the fractions from the collected skimmings. The target fractions include one or more of fat, oil, grease, and protein from an animal source. Subsequent to treating the collected skimmings, the fractions are mechanically separated from the collected skimmings.

DETAILED DESCRIPTION OF THE INVENTION

The objects and advantages enumerated above together with other objects, features, and advances represented by the present invention will now be presented in terms of detailed descriptions which are intended to be representative of various possible embodiments of the invention. Other aspects of the invention are recognized as being within the grasp of those having ordinary skill in the art.

The present invention relates to a method which can be applied to wastewater streams collected from an animal rendering facility, to promote the recovery of valuable byproducts, such as animal fats, oils, greases, and proteins. The method generally involves the treatment of concentrated portions of the wastewater stream with a demulsifying surfactant to promote the recovery of such byproducts. For the purposes hereof, a "demulsifier" is a compound or material which can destabilize an emulsion. A demulsifier can be, under the proper conditions such as temperature, concentration, and the like conditions, an emulsifier compound or substance. Generally, demulsifiers may include one or more known emulsifiers, surfactants, detergents, and the like, which are capable of destabilizing demulsified fat, oil, grease, or protein particles or droplets contained in an at least partially emulsified composition. A "demulsifying surfactant" is a surfactant that is capable of acting as a demulsifier.

For the purposes hereof, the term "HLB" means the hydrophile-lipophile balance of emulsifiers, and is a measure of the relative simultaneous attraction of an emulsifier for oil and water. To counter the effects of emulsifiers that enhance dispersion, suspension and wetting of particles, emulsifiers of the opposite type, which can disrupt the HLB, can be applied.

Figure 1:
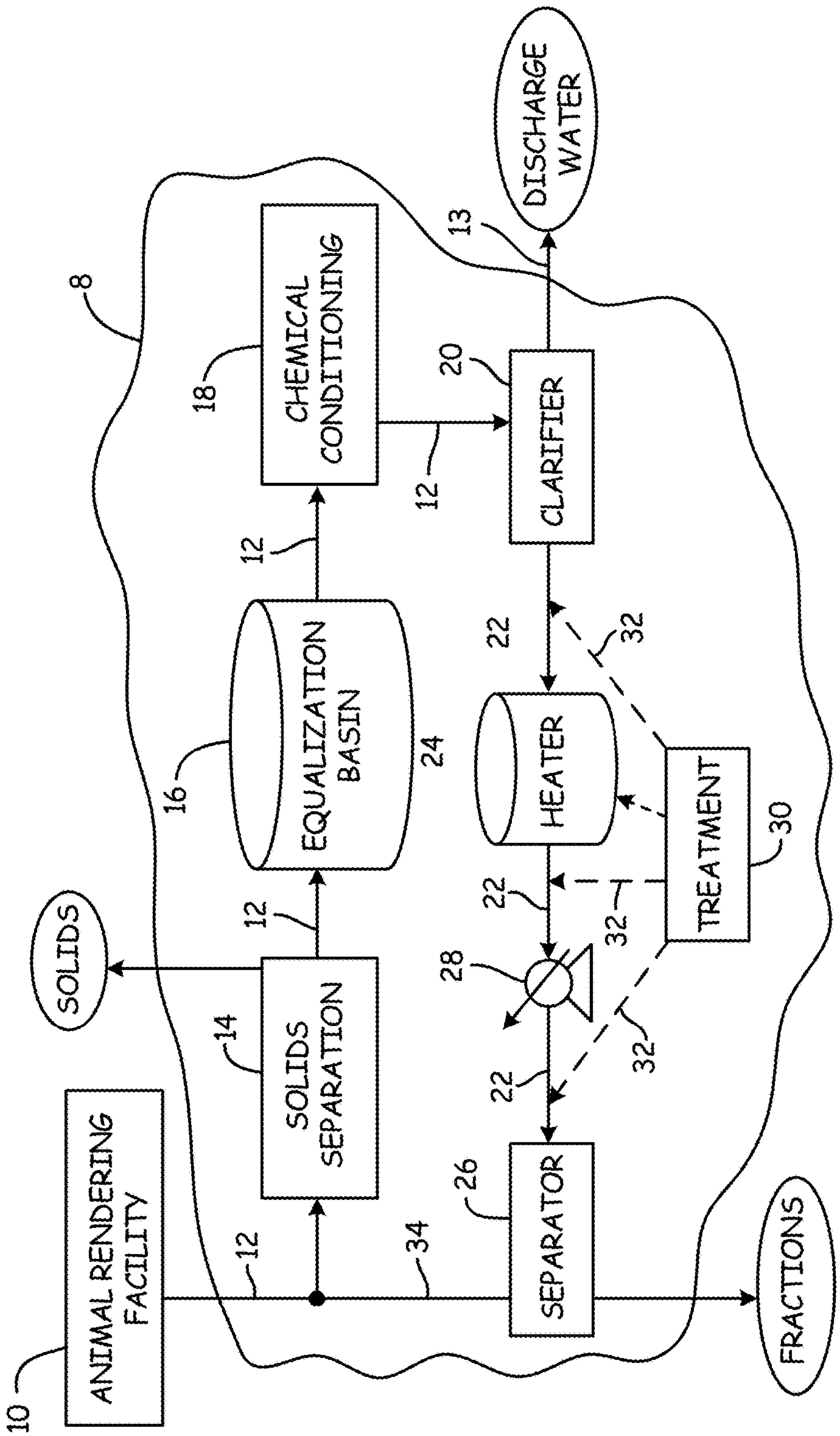
FIG. 1 is a process flow diagram of a method of the present invention.

In an example generic process, illustrated in FIG. 1, a wastewater stream 12 is collected from an animal rendering facility 10 and directed to a "pre-treatment" system 8 for initially cleaning the wastewater stream 12 before it is discharged for further treatment, such as to a municipal water treatment facility, prior to discharge to the environment. Animal rendering facility 10 receives live animals as the raw material for rendering and processing into food. Wastewater collected into wastewater stream 12 originates from several sources of the animal rendering facility 10, including floor washing, equipment cleaning and sanitation, animal carcass rinsing, as well as other related flows (but excludes human sanitary sewage). Typically, the wastewater collection is made through floor drains and the like.

The collected wastewater stream 12 may undergo an initial mechanical separation process at a solids separation stage 14 to remove relatively large-scale solid materials from the wastewater stream. Typical equipment employed for solids separation stage 14 include screening devices such as a roto-screen or a shaker-screen device with known sieve sizes. The screening devices operate in a known manner to separate relatively large particle size material, such as animal cartilage, bone, fat, or other tissue, from the wastewater stream. The screening devices are employed to remove solids having a particle size that is larger than the sieve size of the employed screening device.

Wastewater stream 12 that passes through the sieve openings of the screening device at the solids separation stage 14 may be passed to an equalization basin 16 for equalizing a variable input flow rate of wastewater stream 12 to a more consistent and constant output flow rate for wastewater stream 12 that is downstream from equalization basin 16. Since the volume and character of the collected wastewater from animal rendering facility 10 may vary throughout the day depending on water usage and production schedule, it may be beneficial to normalize the wastewater stream flow rate prior to any chemical conditioning of the wastewater stream 12. For instance, a high-volume, low-strength sanitation period at animal rendering facility 10 may be followed by a low-volume, high-strength sanitation period during sustained animal rendering processes. The "character" of the wastewater stream may include characteristics such as pH, conductivity, and constituent levels including levels of animal blood and grease. Equalization basin 16 may therefore comprise a tank, vessel, piping, or other container to collect input wastewater stream 12 with a sufficient capacity to substantially even out input flow rate to a relatively constant output wastewater stream 12 flow rate. Equalization basin 16 may include a mixing capability to provide relatively consistent downstream flow character that allows for stability in downstream chemical dosing needs to wastewater stream 12. Equalization basin 16 may be positioned upstream or downstream from the solids separation stage 14, as appropriate for the particular application.

Equalized and screened wastewater stream 12 is then preferably chemically conditioned with one or more chemical conditioning agents at a conditioning stage 18. As is well known in the art, various chemical conditioning agents may be applied to a wastewater flow to both remove as many contaminants as possible, and to normalize pH levels to near-neutral ranges. In some cases, however, the wastewater flow may be acidified or rendered caustic to enhance chemical conditioning agent activity. Example chemical conditioning processes include acidic pH control, caustic pH control, and addition of agents to promote coagulation, flocculation, and adsorbencies to facilitate removal of contaminants. The chemical conditioning program is typically designed to maximize the removal of contaminants that contribute to downstream wastewater processing and disposal expense. Tests for grouping target contaminants include biological oxygen demand (BOD), oil and grease (O&G), total suspended solids (TSS), chemical oxygen demand (COD), Total Kjeldahl Nitrogen (TKN), and the like. In some cases, the recovered byproducts from the chemical conditioning processing may themselves have commercial value. The chemical conditioning agents employed at conditioning stage 18 may therefore be intentionally selected to not degrade the quality, safety, or marketability of the recovered byproducts.

The chemically conditioned wastewater stream 12 may typically be directed to a clarifying stage 20 at which contaminants targeted by the one or more chemical conditioning agents at chemical conditioning stage 18 may be removed. Typically, such clarifying involves the separation of water from the coagulated and flocculated contaminants using any means commonly used for solid-liquid separation. In many embodiments, the separation is accomplished in a low-shear separation device such as a dissolved air floatation (DAF) unit in which oil droplets and light solids may be removed from the water by introducing small bubbles of air or gas into the water. The air bubbles act as scavengers, attaching themselves to the contaminants, and floating them up to the gravitationally upper surface of the liquid in a retention tank to form a float region of contaminants. DAF uses pressurized water, supersaturated with air, to release bubbles 30-120 micrometers in size. In this system, fine solid particles and immiscible droplets attach to small air bubbles, which are derived from compressed air that is injected into the bottom of the retention tank at clarifier stage 20. As the air bubbles rise to the surface of the retention tank, the contaminants form a float region of contaminants that can be skimmed off the surface. This floatation process buoyant the contaminants toward a gravitationally upper surface of the wastewater stream 12 (within a retention tank) to form the float region of contaminants. The clarifier stage 20 may further include a skimming device for mechanically removing the float region of contaminants from the wastewater stream as collected skimmings. In some cases, relatively dense debris may sink to the bottom of the retention tank, and may be removed by mechanical means for combination with the collected skimmings.

The collected skimmings may optionally be mechanically screened to remove relatively large particle size solids. In some cases, the collected skimmings may be directed to a heating vessel for raising the temperature of the collected skimmings to a point at which flowability is enhanced, and chemical/physical bonds preventing separation may be relaxed. The collected skimmings may or may not be heated, such that the temperature for further processing may be up to the boiling point of the mixture, such as, for example, 100° C. A typical temperature range for processing the collected skimmings 22 may be between 15-90° C. As illustrated in FIG. 1, collected skimmings 22 may be processed at a heating vessel 24 to reach a target elevated temperature. The heating vessel 24 may further act to normalize an output flow rate of the collected skimmings to a mechanical separator 26. Pump 28 may be utilized to motivate the collected skimmings 22 to separator stage 26.

As noted in FIG. 1, clarifier stage 20 separates collected skimmings 22 from wastewater stream 12, to reduce a discharge water stream 13 that may be discharged to a downstream water treatment facility, such as a municipal wastewater treatment facility.

Applicants have determined that a treatment stage 30 for treating the collected skimmings 22 downstream from concentration process steps to separate insoluble or immiscible contaminants from wastewater stream 12 is effective in recovering desirable fractions of fats, oils, greases, and proteins from the collected skimmings. Applicants have determined that treating the collected skimmings with an effective amount of a demulsifying surfactant, subsequent to processing the wastewater stream to separate insoluble or immiscible contaminants from the wastewater stream, substantially aids in the recovery of such identified fractions. It is noted that conventional approaches for the addition of chemical additives for aiding component extractions usually address points prior to the separation of insoluble or immiscible contaminants from the process stream. In this case, treatment with a demulsifying surfactant only after such processing of the wastewater stream has been found to promote separation of the fractions from the collected skimmings 22.

The treatment location options of the present method are indicated in FIG. 1 by treatment applications 32. In most embodiments, only a single treatment application 32 is necessary, though it is envisioned that multiple treatment applications at different locations along the collected skimmings stream may be desired. Preferably, the point of entry of the treatment application 32 should provide for even dispersion of the demulsifying surfactant throughout the collected skimmings 22. Examples of preferred injection points of treatment application 32 include prior to heater stage 24, into the heater tank 24 itself, the inlet side of centrifuge feed pump 28 and/or the discharge side of centrifuge feed pump 28, upstream from separator stage 26.

Treatment stage 30 preferably employs a nonionic demulsifying surfactant to aid in the recovery of the fractions, which are the valuable byproducts of wastewater stream 12, and which may include one or more of fat, oil, grease, and protein. Applicants have discovered that nonionic demulsifying surfactants effectively enhance the recovery of such fractions, with such surfactant aiding in the demulsification of the fractions from the collected skimmings 22. Though it is generally understood that surfactants can make fats, oils, and greases extremely difficult to recover from wastewater due to the solubility of oil emulsified by the surfactants, Applicant has surprisingly discovered that nonionic demulsifying surfactants may indeed aid in the recovery of such fats, oils, greases, and even proteins derived from wastewater output from animal rendering facility 10.

Because the recovered fractions from wastewater stream 12 may have commercial value in feedstocks, it is particularly desired to employ a nonionic demulsifying surfactant that is food grade, and "generally recognized as safe" (GRAS), as certified by the United States Food and Drug Administration.

Though several food grade demulsifying surfactants are contemplated as being useful in the methods of the present invention, one class of surfactants found by Applicants to be particularly useful include alkoxylated fatty acid esters of sorbitan. Preferably, the alkoxylated fatty acid esters of sorbitan have an alkyl chain length of from about 6 about 20 carbons, and are preferably alkoxylated with between about 5 to about 100 moles of alkyl oxide. Preferred alkyl oxides are ethylene oxide and propylene oxide or a combination thereof. Representative demulsifying surfactants of the present invention include polyoxyethylene sorbitan fatty acid esters with the general structure of:

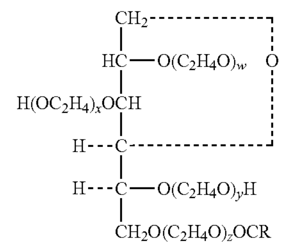

Where w+x+y+z=20.

Example fatty acid esters are monooleate, trioleate monostearate, monopalmitate, and monolearate. A particular preferred nonionic demulsifying surfactant useful in the promotion of separation of fat, oil, grease, and protein from the collected skimmings is polyoxyethylene sorbitan monooleate that has been alkoxylated with approximately 20 moles of ethylene oxide or propylene oxide or a combination thereof.

Feed rates for the nonionic demulsifying surfactant may range from 100-2000 ppm based on the weight of the collected skimmings stream 22, and more preferably between 200-1000 ppm. The nonionic demulsifying surfactant may be applied to collected skimmings 22 in a temperature range that, for example, may be between about 15-90° C. It has been determined that the HLB of the effective nonionic demulsifying surfactants may be between about 14-17, with the HLB of polyoxyethylene sorbitan monooleate being about 15.

Figure 2:
FIG. 2 is an illustration of an emulsion before and after treatment as set forth in a method of the present invention.

Without treatment application 32, the water phase of collected skimmings 22 contains an emulsion of protein/water/fat that is neither buoyant enough nor dense enough to be separated. Without breaking such emulsion, saleable product may be lost to waste. FIG. 2 demonstrates an example emulsion before and after treatment application 32, wherein the centrifuge vial at right contains an untreated sample with a thick cap of emulsion extending to below the 10 ml mark on the vial. By contrast, the vial on the left contains treated collected skimmings, such that the emulsion is "broken", and the oil, proteins, fats, and greases are able to be recovered at separator stage 26.

Subsequent to treatment application 32 of the nonionic demulsifying surfactant, the collected skimmings 22 are subjected to mechanical separation to separate the fractions from the collected skimmings 22. Separator stage 26 may include some combination of one or more of centrifuges and settling tanks, as is well known in the art. Accordingly, mechanically separating the fractions from collected skimmings 22 may include centrifuging the collected skimmings 22 into three phases, with a first phase including the fractions, a second phase including solid material, and a third phase including a liquidous composition. Typically, the centrifuge may be either a horizontal three-phase design, or a stacked-disk configuration, as are well-known in the art. The liquidous composition 34 may be returned to wastewater stream 12 as "stick-water" at a location prior to chemical conditioning stage 18.

Recovery of the fractions represents value to the animal rendering facility 10 through both the sale of valuable byproducts, and their removal from discharge stream 13. This not only reduces the totally volume discharged, which is typically assessed a per unit volume fee by a municipal water treatment facility, but also removes some of the byproducts that would otherwise be considered "contaminants" and assessed a per unit weight fee for disposal.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A method for recovering fractions from an animal rendering process wastewater stream, said method comprising:

collecting the wastewater stream from an animal rendering facility;

screening the wastewater stream with a screening device having a sieve size, said screening separating solids having a particle size larger than said sieve size from the wastewater stream;

conditioning the wastewater stream with a chemical conditioning agent, including at least one of a flocculating agent, a coagulating agent, an adsorbent agent, and a pH-adjusting agent;

subsequent to conditioning the wastewater stream, applying a floatation process to the wastewater stream in a first retention tank to buoy contaminants toward a gravitationally upper surface of the wastewater stream to form a float region of contaminants;

mechanically removing the float region of contaminants from the wastewater stream as collected skimmings;

treating the collected skimmings at 15-90° C. with an effective amount of a non-ionic demulsifying surfactant to promote separation of the fractions from the collected skimmings, wherein the fractions include one or more of fat, oil, grease, and protein; and subsequent to treating the collected skimmings, mechanically separating the fractions from the collected skimmings.

2. A method as in claim 1, wherein mechanically separating the fractions from the collected skimmings includes centrifuging said collected skimmings.

3. A method as in claim 2, including following centrifuging, separating the collected skimmings into three phases, with a first phase including the fractions, a second phase including solid material, and a third phase including a liquidous composition.

4. A method as in claim 3, including adding the third phase to the wastewater stream at a location prior to the conditioning step.

5. A method as in claim 1 wherein said floatation process includes dissolved air flotation.

6. A method as in claim 5 wherein said contaminants are insoluble or immiscible in water.

7. A method as in claim 6 wherein said contaminants include at least one of flocculants, coagulants, and agglomerants.

8. A method as in claim 1 wherein said demulsifying surfactant is GRAS-certified.

9. A method for recovering fractions from an animal rendering process wastewater stream, said method comprising:

collecting the wastewater stream from an animal rendering facility;

processing the wastewater stream to separate insoluble or immiscible contaminants from the wastewater stream as collected skimmings; and treating the collected skimmings with an effective amount of a demulsifying surfactant comprising one or more alkoxylated fatty acid esters of sorbitan, said demulsifying surfactant promoting the separation of the fractions from the collected skimmings, wherein the fractions include one or more of fat, oil, grease, and protein.

10. A method as in claim 9 wherein said demulsifying surfactant has an HLB value of between about 14-17.

11. A method as in claim 10 wherein said demulsifying surfactant is GRAS-certified.

12. A method as in claim 11 wherein said demulsifying surfactant includes a polyoxyethylene sorbitan monooleate.

13. A method as in claim 9, including, subsequent to treating the collected skimmings, mechanically separating the fractions from the collected skimmings.

* * * * *